United States Patent
DiVerdi et al.

(10) Patent No.: US 10,592,776 B2
(45) Date of Patent: Mar. 17, 2020

(54) GENERATING MULTIMODAL IMAGE EDITS FOR A DIGITAL IMAGE

(71) Applicant: Adobe Inc., San Jose, CA (US)

(72) Inventors: Stephen DiVerdi, Oakland, CA (US); Matthew Douglas Hoffman, San Francisco, CA (US); Ardavan Saeedi, Cambridge, MA (US)

(73) Assignee: ADOBE INC., San Jose, CA (US)

( * ) Notice: Subject to any disclaimer, the term of this patent is extended or adjusted under 35 U.S.C. 154(b) by 337 days.

(21) Appl. No.: 15/427,598

(22) Filed: Feb. 8, 2017

(65) Prior Publication Data
US 2018/0225812 A1    Aug. 9, 2018

(51) Int. Cl.
*G06K 9/62* (2006.01)
*G06K 9/46* (2006.01)
*G06T 11/60* (2006.01)

(52) U.S. Cl.
CPC ......... *G06K 9/6223* (2013.01); *G06K 9/4628* (2013.01); *G06K 9/627* (2013.01); *G06T 11/60* (2013.01)

(58) Field of Classification Search
CPC .... G03B 27/735; G06F 3/04842; G06K 9/46; G06K 9/627; G06K 9/6274; G06K 9/6298; G06K 9/00389; G06K 9/00234; G06K 9/00362; G06K 9/6223; G06K 9/4628; G06T 7/0002; G06T 7/11; G06T 11/001; G06T 11/60; H04B 15/00; H04N 19/126
USPC .................. 1/1; 358/452; 382/103, 225, 254
See application file for complete search history.

(56) References Cited

U.S. PATENT DOCUMENTS

| | | | | |
|---|---|---|---|---|
| 6,728,421 B2* | 4/2004 | Kokemohr | .......... | G06F 3/04845 382/284 |
| 7,372,996 B2* | 5/2008 | Luo | .................... | G06K 9/00362 382/103 |
| 7,593,603 B1* | 9/2009 | Wilensky | .................. | G06T 5/00 358/1.2 |

(Continued)

OTHER PUBLICATIONS

Sohn, K., Yan, X., and Lee, H.,"Learning Structured Output Representation using Deep Conditional Generative Models," Part of: Advances in Neural Information Processing Systems 28 (NIPS 2015), Dec. 2015.*

(Continued)

*Primary Examiner* — Xuemei G Chen
(74) *Attorney, Agent, or Firm* — Keller Jolley Preece

(57) ABSTRACT

The present disclosure is directed towards methods and systems for determining multimodal image edits for a digital image. The systems and methods receive a digital image and analyze the digital image. The systems and methods further generate a feature vector of the digital image, wherein each value of the feature vector represents a respective feature of the digital image. Additionally, based on the feature vector and determined latent variables, the systems and methods generate a plurality of determined image edits for the digital image, which includes determining a plurality of set of potential image attribute values and selecting a plurality of sets of determined image attribute values from the plurality of sets of potential image attribute values wherein each set of determined image attribute values comprises a determined image edit of the plurality of image edits.

20 Claims, 7 Drawing Sheets

(56) References Cited

U.S. PATENT DOCUMENTS

| | | | | |
|---|---|---|---|---|
| 8,194,992 | B2* | 6/2012 | Marchesotti | G06K 9/00234 |
| | | | | 358/452 |
| 8,340,452 | B2* | 12/2012 | Marchesotti | G03B 27/735 |
| | | | | 382/254 |
| 9,256,950 | B1* | 2/2016 | Xu | G06K 9/00281 |
| 9,330,340 | B1* | 5/2016 | Diverdi | G06T 7/0002 |
| 9,639,956 | B2* | 5/2017 | Krishnaswamy | G06K 9/46 |
| 9,830,526 | B1* | 11/2017 | Lin | G06K 9/6298 |
| 9,836,821 | B2* | 12/2017 | Higashi | G06T 3/4053 |
| 9,940,551 | B1* | 4/2018 | Mordvintsev | G06K 9/627 |
| 10,074,161 | B2* | 9/2018 | Shen | G06T 11/001 |
| 2015/0023607 | A1* | 1/2015 | Babin | G06K 9/00389 |
| | | | | 382/225 |
| 2016/0241346 | A1* | 8/2016 | Hoffman | H04B 15/00 |
| 2017/0098152 | A1* | 4/2017 | Kerr | G06F 3/04842 |
| 2018/0124423 | A1* | 5/2018 | Choi | G06K 9/6274 |
| 2018/0174275 | A1* | 6/2018 | Bourdev | H04N 19/126 |
| 2018/0204051 | A1* | 7/2018 | Li | G06T 7/11 |

OTHER PUBLICATIONS

C. M. Bishop. Mixture density networks. Neural Computing Research Group Dept. of Computer Science and Applied Mathematics Aston University. Birmingham, U.K. Feb. 1994.

V. Bychkovsky, S. Paris, E. Chan, and F. Durand. Learning photographic global tonal adjustment with a database of input/output image pairs. In Computer Vision and Pattern Recognition (CVPR), 2011 IEEE Conference on, pp. 97-104. IEEE, 2011.

Y. N. Dauphin and D. Grangier. Predicting distributions with linearizing belief networks. arXiv preprint arXiv:1511.05622, 2015.

M. D. Hoffman, D. M. Blei, C. Wang, and J. Paisley. Stochastic variational inference. The Journal of Machine Learning Research, 14(1):1303-1347, 2013.

H. Ishwaran and M. Zarepour. Exact and approximate sum representations for the dirichlet process. Canadian Journal of Statistics, 30(2):269-283, 2002.

R. Jaroensri, S. Paris, A. Hertzmann, V. Bychkovsky, and F. Durand. Predicting range of acceptable photographic tonal adjustments. In Computational Photography (ICCP), 2015 IEEE International Conference on, pp. 1-9. IEEE, 2015.

M. J. Johnson, D. Duvenaud, A. B. Wiltschko, S. R. Datta, and R. P. Adams. Structured vaes: Composing probabilistic graphical models and variational autoencoders. arXiv preprint arXiv:1603.06277, 2016.

D. P. Kingma and M. Welling. Auto-encoding variational bayes. arXiv preprint arXiv:1312.6114, 2013.

Y. Koyama, D. Sakamoto, and T. Igarashi. Selph: Progressive learning and support of manual photo color enhancement. In Proceedings of the 2016 CHI Conference on Human Factors in Computing Systems, pp. 2520-2532. ACM, 2016.

J.-Y. Lee, K. Sunkavalli, Z. Lin, X. Shen, and I. S. Kweon. Automatic content-aware color and tone stylization. arXiv preprint arXiv:1511.03748, 2015.

R. M. Neal. Connectionist learning of belief networks. Artificial intelligence, 56(1):71-113, 1992.

Y. Tang and R. R. Salakhutdinov. Learning stochastic feedforward neural networks. In Advances in Neural Information Processing Systems, pp. 530-538, 2013.

Z. Yan, H. Zhang, B. Wang, S. Paris, and Y. Yu. Automatic photo adjustment using deep neural networks. ACM Transactions on Graphics (TOG), 35(2):11, 2016.

* cited by examiner $\{\mu(x_m, s_k; \gamma)\}_{k=1}^{K}$ K samples for the slider values

→ 302

K-means clustering and choosing the cluster centers

→ 304

5 set of predicted slider values

*FIG. 3*

GENERATING MULTIMODAL IMAGE EDITS FOR A DIGITAL IMAGE

BACKGROUND

Conventional image editing systems allow users to manually edit images by manipulating features. For example, conventional image editing systems allow users to adjust values of contrast, vibrance, saturation etc. of a digital image. For many users, particularly inexperienced users, adjusting feature values is not intuitive. For example, the users do not know how to adjust features values to achieve a desired image edit. As a result, such conventional image editing systems often require inexperienced users to edit images through a trial and error process (e.g., an iterative process).

Some image editing systems, in an effort to address the above-described problem, provide an automatic image edits. However, such image editing systems typically apply the same generic edit to the digital image regardless of the content of the actual image or the preferences of the user. Such "one size fits all" image edits often are unsatisfactory.

As such, conventional automatic image edits may not reflect how a user would edit an image. In particular, conventional automatic image edits are typically not personalized to the user or to an editing level (e.g., category) of the user. Thus, often images to which automatic image edits are applied have the same general feel.

Accordingly, these and other disadvantages exist with respect to conventional image editing systems.

BRIEF SUMMARY

The various embodiments described below provide benefits and/or solve one or more of the foregoing or other problems in the art with systems and methods for predicting multimodal image edits for a digital image. For example, the systems and methods disclosed herein analyze a digital image and determine a plurality of predicted image edits for the particular digital image. In some embodiments, the systems and methods determine and provide predicted image edits based on the particular features of the digital image. Specifically, the systems and methods determine (e.g., extract) the features of the digital image, determine likely image edits that correlate to the extracted features of the digital image, and provide the image edits for selection by a user.

In one or more embodiments, the systems and methods determine and provide multiple styles of predicted image edits for a particular digital image. For example, the systems and methods determine and provide a diverse set of predicted image edits for a given digital image. Furthermore, because the systems and methods determine and provide multiple predicted image edits for a particular digital image, the systems and methods are more likely to provide an image edit that reflects a user's style in editing digital images.

Additional features and advantages of the embodiments will be set forth in the description that follows, and in part will be obvious from the description, or may be learned by the practice of such example embodiments. The features and advantages of such example embodiments may be realized and obtained by means of the instruments and combinations particularly pointed out in the appended claims. These, and other features, will become more fully apparent from the following description and appended claims, or may be learned by the practice of such example embodiments as set forth hereinafter.

BRIEF DESCRIPTION OF THE DRAWINGS

Various embodiments will be described and explained with additional specificity and detail through the use of the accompanying drawings in which:

FIG. 3 illustrates an additional sequence-flow diagram of determining a plurality of predicted image edits for a digital image in accordance with one or more embodiments;

DETAILED DESCRIPTION

Figure 1:
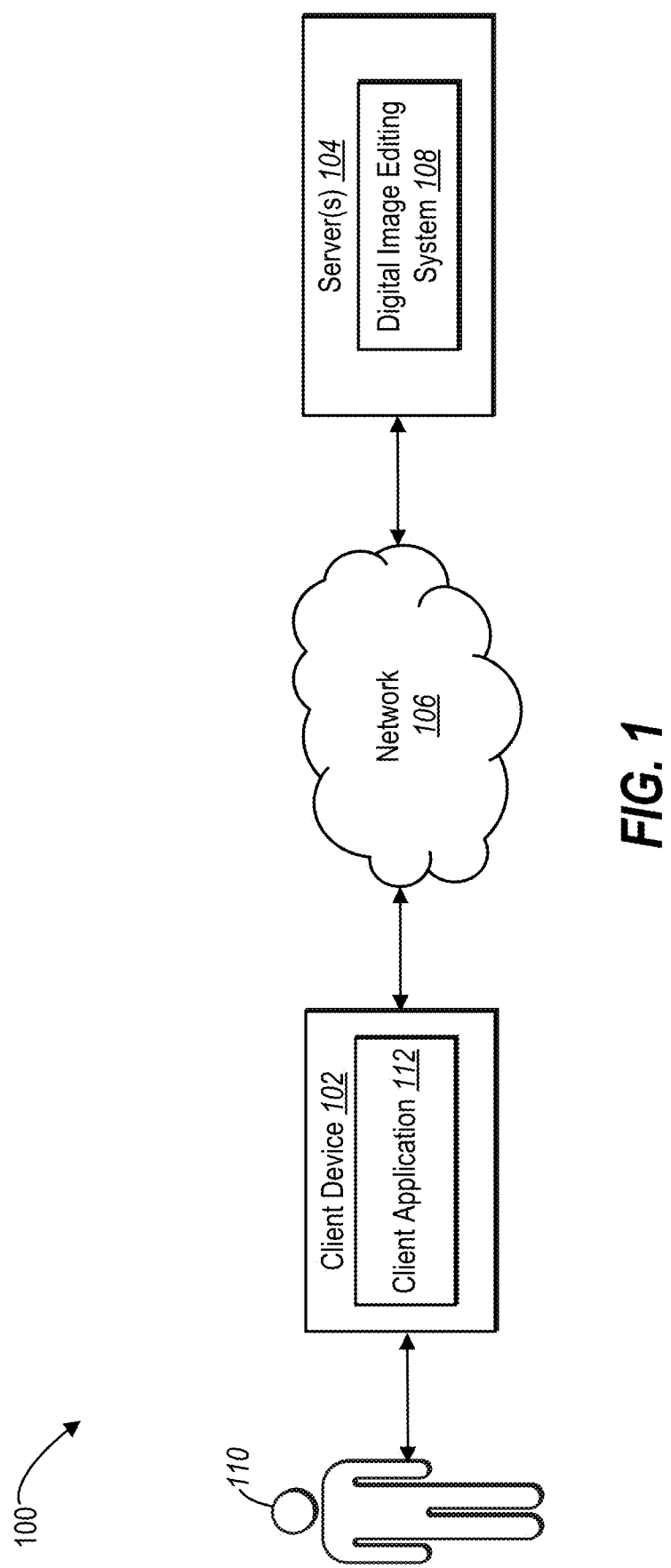
FIG. 1 illustrates a schematic diagram of an example environment in which the digital image editing system can operate in accordance with one or more embodiments.

The embodiments described below provide for an image editing system for determining predicted image edits for a given digital image (e.g., an input image). For instance, the image editing system analyzes the given digital image and determines a set of different stylistic image edits (e.g., enhancements) for the digital image. In one or more embodiments, the image editing system determines the predicted image edits based on the particular features of the given digital image. For example, the image editing system analyzes a given digital image to determine particular features of the given digital image, and based how a user would typically edit digital images given those particular features, the image editing system determines the predicted image edits for the given image. In additional embodiments, the image editing system determines personalized predicted image edits for the given digital image based on a determined editing category of a user providing the digital image. Each of the foregoing is described in further detail below.

In one or more embodiments and as noted above, the image editing system determines the predicted image edits based on the particular features of the given digital image and how users typically edit digital images based on those features. In particular, the image editing system analyzes the digital image utilizing a machine learning system (e.g., a feature extractor) to extract features of the digital image. The image editing system generates a feature vector representing the features of the digital image extracted by the machine learning system. In addition to extracting features of the digital image, the image editing system determines latent variables (e.g., noise elements) and weight values of the extracted features and latent variables utilizing the machine learning system. The image editing system determines weight values based on data representing how users typically edit digital images based on those features (e.g., history edit data). Based on the feature vector of the digital image, the latent variables, and the associated weight values, the image editing system determines a distribution of potential image edits of the given digital image. Upon determining the distribution of potential image edits, the image editing system clusters the potential image edits and selects the predicted image edits from the clusters.

Therefore, because the image editing system determines the predicted image edits based on the particular features of the given digital image and how users would typically edit the given digital image, the image editing system of the present disclosure is advantageous over conventional image editing systems. For example, and unlike conventional systems, the image editing system provides image specific edits, which take into account the unique features of the digital image. Accordingly, instead of providing a universal (i.e., one size fits all) automatic image edit to a user, the image editing system provides predicted image edits that are unique to the digital image. The foregoing results in a more effective and streamlined experience for a user utilizing the image editing system.

Additionally, as noted above, the image editing system determines a plurality of (i.e., multiple) predicted image edits for each given digital image. In particular, the image editing system determines a diverse set of image edits for each given digital image. For example, and as noted above, the image editing system can cluster the potential image edits determined by the image editing system, and based on the clusters, the image editing system can select a predicted image edit from each cluster. Accordingly, unlike conventional systems, which typically only provide one automatic image edit to users, the image editing system of the present disclosure provides multiple predicted image edits to the user. As a result, the image editing system provides options to the user in editing the digital image. Furthermore, because the image editing system determines a plurality of predicted image edits for each given digital image, the image editing system is more likely to provide predicted image edits that the user actually desires to make. Thus, the image editing system can provide a more powerful and flexible image editing system to the user in comparison to conventional systems.

Moreover, as noted above, the image editing system optionally determines personalized image edits for the given digital image based on a determined editing category of the user. For example, based on history data indicating how users have previously edited images, the image editing system categorizes the users. In some embodiments, the image editing system can learn via a machine learning system how a user typically edits digital images and can associate an editing category with the user. Additionally, based on the determined category of the user and the features of a given digital image, the image editing system can provide personalized image edits to the user that reflect how users of the determined category would edit the digital image.

Because the image editing system determines personalized image edits for the given digital image based on a determined editing category of the user, the image editing system provides advantages over conventional systems by providing images edits that best reflect the types of image edits users (i.e., real persons) actually want. Furthermore, because the image editing system can predict the image edits a user will typically want, the image editing system provides a more enjoyable, effective, and personalized experience to the user in editing digital images. Moreover, one of ordinary skill in the art will readily recognize that the foregoing will result in additional usage of the image editing system of the present disclosure in comparison to conventional systems. Additionally, as will be appreciated by one of ordinary skill in the art, unlike conventional systems, the image editing system of the present disclosure provides predicted image edits that are tailored to both the digital image and the user simultaneously.

Furthermore, the image editing system described herein provides improvements in the performance of a computer system. For example, as will be discussed in greater detail below, because the image editing system does not require redundant image edits per training image in order to train the image editing system, the image editing system reduces required processing power, memory, and resources needed to train the image editing system and, ultimately, determine the predicted image edits for a given digital image in comparison to conventional systems. In other words, the image editing system results in less required processing power and communication bandwidth in comparison to conventional systems.

FIG. 1 illustrates a schematic diagram of an example environment 100 in which a digital image editing system can operate in accordance with one or more embodiments. As illustrated, the environment 100 includes a client device 102, at least one server 104 including a digital image editing system 108, and a network 106. The client device 102 and the server 104 can communicate via the network 106. The network 106 can include one or more networks, such as the Internet, and can use one or more communications platforms or technologies suitable for transmitting data and/or communication signals. Although FIG. 1 illustrates a particular arrangement of the client device 102, the server 104, and the network 106, various additional arrangements are possible. For example, the server 104 and, accordingly, the digital image editing system 108, can directly communicate with the client device 102, bypassing the network 106. In alternative embodiments, the communication system 100 does not include the server 104 and/or the network 106. Rather, in such embodiments, the client device 102 can include the digital image editing system 108 thereon (e.g., installed/stored thereon). In particular, the server 104 and the network 106 are not required in every embodiment of the present disclosure.

As illustrated in FIG. 1, a user 110 can interface with the client device 102, for example, to communicate with the server 104 and to utilize the digital image editing system 108 to edit (e.g., manipulate) a digital image. The user 110 can be an individual (i.e., human user), a business, a group, or any other entity. In addition, the user 110 can be an author of the digital image and can upload the digital image to the server 104 and/or image editing system 108 via the client device 102 and/or the network 106. Although FIG. 1 illustrates only one user 110 associated with the client device 102, the communication system 100 can include any number of a plurality of users that each interact with the communication system 100 using a corresponding client device.

In some embodiments, the client device 102 includes a client application 112 installed thereon. The client application 112 can be associated with the digital image editing system 108. For example, the client application 112 allows the client device 102 to directly or indirectly interface with the digital image editing system 108. The client application 112 also enables the user 110 to provide a digital image to the digital image editing system 108 and the client device 102 to receive predicted image edits to the digital image. In additional embodiments, such as embodiments not including the server 104 and/or the network 106, the client application 112 can include the digital image editing system 108.

Both the client device 102 and the server 104 can represent various types of computing devices with which users can interact. For example, the client device 102 and/or the server 104 can be a mobile device (e.g., a cell phone, a smartphone, a PDA, a tablet, a laptop, a watch, a wearable device, etc.). In some embodiments, however, the client device 102 and/or server 104 can be a non-mobile device (e.g., a desktop or server). Additional details with respect to the client device 102 and the server 104 are discussed below with respect to FIG. 6.

Figure 2A:
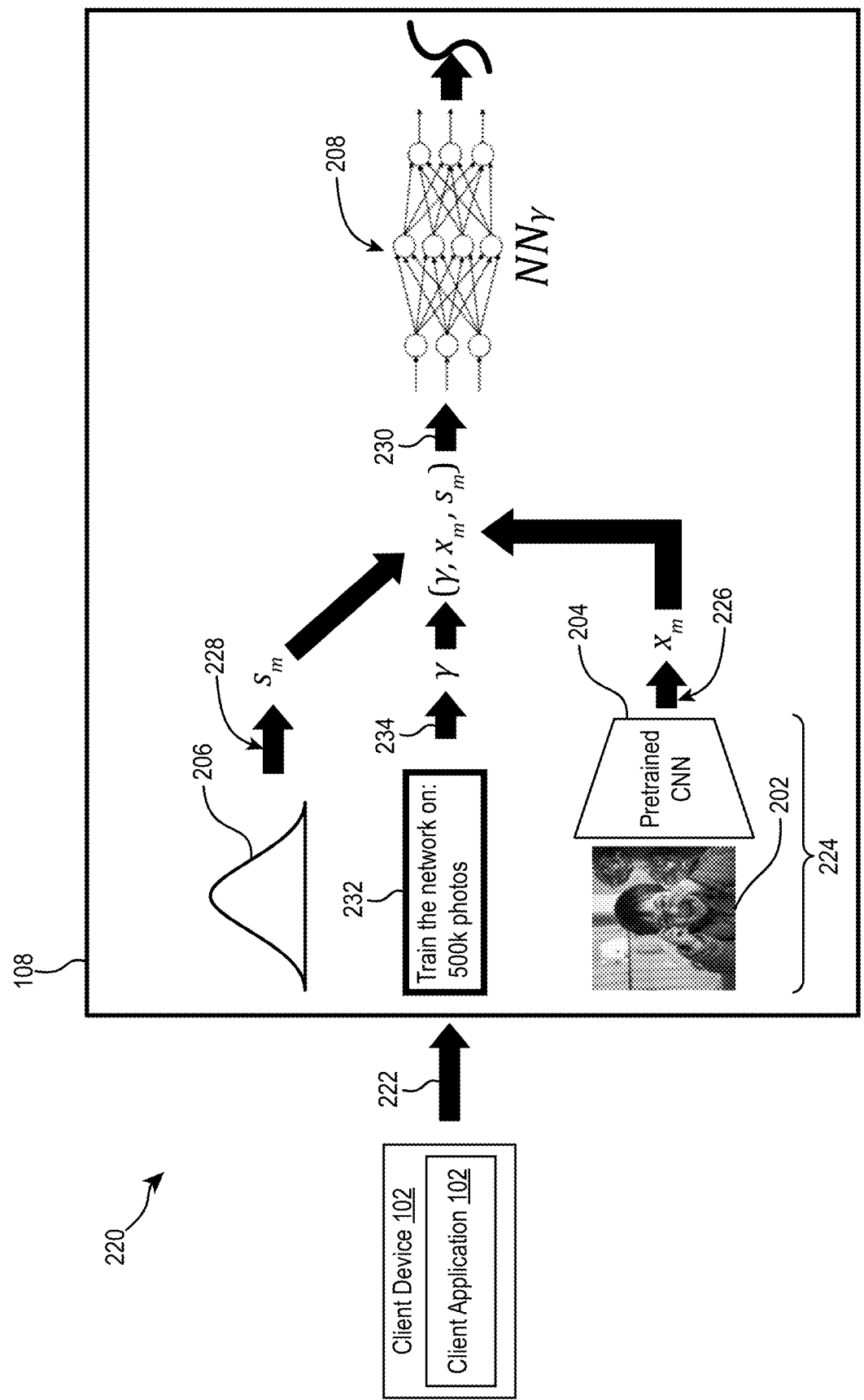
FIGS. 2A and 2B illustrate a sequence-flow diagram that an image editing system can utilize to determine a plurality of predicted image edits for a digital image according to one or more embodiments of the present disclosure.
Figure 2B:
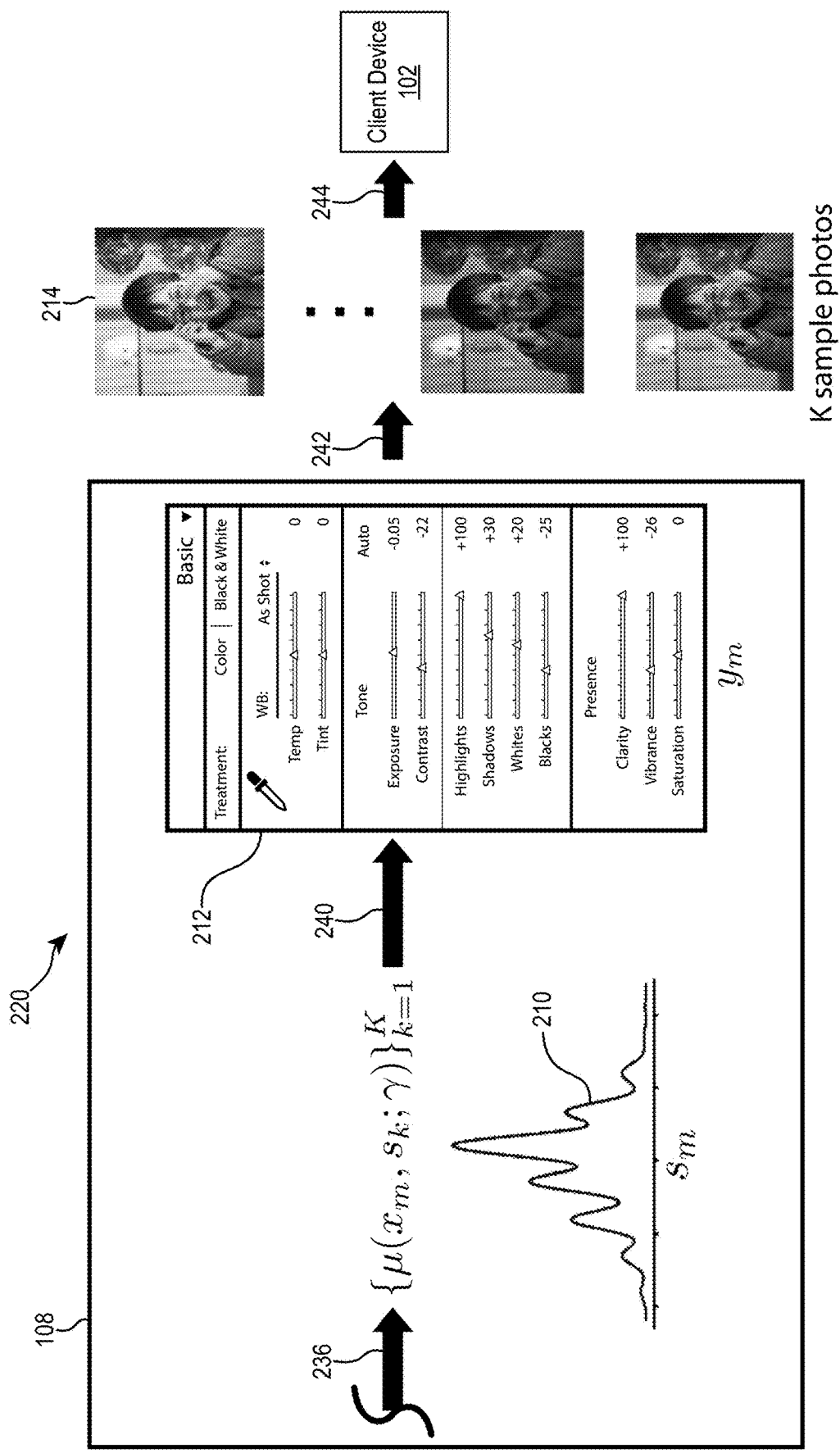

As is described in further detail below with regard to FIGS. 2A-4, the digital image editing system 108 receives a digital image from the client device 102 (e.g., from the user 110 via the client device 102) and analyzes the digital image to determine a plurality of predicted image edits for the digital image. In particular, the digital image editing system 108 can analyze the digital image to predict potential multimodal image edits for the digital image based on features of the digital image. FIGS. 2A and 2B illustrate example processes of the digital image editing system 108 via a schematic-flow diagram. For instance, FIGS. 2A and 2B illustrate one or more embodiments of a sequence-flow that the digital image editing system 108 utilizes to determine a plurality of predicted image edits for a digital image 202. Furthermore, in one or more embodiments, the acts illustrated in relation to FIGS. 2A and 2B may be performed as a step 220 for determining a plurality of predicted image edits for the digital image 202.

Referring to FIG. 2A, the client device 102 (e.g., a user via the client device 102) provides a digital image 202 to the digital image editing system 108 for determining a plurality of predicted image edits for the digital image 202, as shown in act 222. For example, the client device 102 can provide the digital image 202 to the digital image editing system 108 via the client application 112. To illustrate, the client device 102 can provide the digital image 202 to the digital image editing system 108 via an application, including ADOBE® PHOTOSHOP® software ADOBE® INDESIGN® or ADOBE® LIGHTROOM® software. "ADOBE," "PHOTOSHOP," "INDESIGN," and "LIGHTROOM" are either registered trademarks or trademarks of Adobe Systems Incorporated in the United States and/or other countries.

In response to receiving the digital image 202 from the client device 102, the digital image editing system 108 analyzes the digital image 202, as shown in act 224 of FIG. 2A. In particular, the digital image editing system 108 analyzes the digital image 202 to determine (e.g., extract) features of the digital image 202. In some embodiments, the digital image editing system 108 can analyze the digital image 202 utilizing a machine learning system 204 (e.g., a feature extractor). Furthermore, utilizing the machine learning system 204, the digital image editing system 108 can determine the features of the digital image 202. In some instances, the digital image editing system 108 can determine the features of the digital image 202 via a machine-learning system utilizing one or more of the methods described in V. Bychkovsky et al., *Learning Photographic Global Tonal Adjustment with a Database of Input/Output Image Pairs*, IEEE Computer Vision and Pattern Recognition (2011), the disclosure of which is incorporated by reference herein in its entirety.

In one or more embodiments, the features of the digital image 202 can include, but are not limited to, contrast, exposure, saturation, temperature, tint, highlights, shadows, whites, blacks, lights, darks, clarity, and vibrance of the digital image 202. The features can further include colors (e.g., red, orange, yellow, green, aqua, blue, purple, magenta, etc.) of the digital image 202. Moreover, the features can refer to values for distortion, defringe, and vignetting of the digital image 202. Additionally, the features can include color histograms included in the digital image 202.

In some embodiments, the machine learning system 204 can include a pre-trained convolutional neural network (CNN). Furthermore, the pre-trained CNN can include a conventional CNN that consists of multiple layers of small neuron collections that analyze small portions of the digital image 202 at a time. The results of these collections are then tiled to overlap, which provides a better representation of the digital image 202. The CNN can include multiple convolutional layers and one or more fully connected layers. In some embodiments, the pre-trained CNN is trained to extract high-level features from the digital image 202. In particular, the CNN can include any of the pre-trained CNNs described in, for example, Yan, H. Zhang et al., *Automatic photo adjustment using deep neural networks*. ACM Transactions on Graphics, 35(2): 11 (2016) or Bychkovsky, S. Paris et al., *Learning photo-graphic global tonal adjustment with a database of input/output image pairs*, Computer Vision and Pattern Recognition, 2011 IEEE Conference, pp. 97-104 (2011), the disclosures of which are incorporated by reference herein in their entireties. While sample CNNs are described herein, one of ordinary skill in the art will appreciate that the machine learning system 204 may employ various different CNN models. For example, the CNN may vary in size, uses any number of layers and/or connections, may modify how the connections are connected, and may be trained via other methods.

Upon determining the features of the digital image 202, the digital image editing system 108 generates a feature vector ($x_m$) representing the features of the digital image 202, as shown in act 226 of FIG. 2A. Furthermore, each value (i.e., component) within the feature vector ($x_m$) represents a determined feature of the digital image 202. In some embodiments, the digital image editing system 108 can generate the feature vector ($x_m$) utilizing the machine learning system. For example, when the machine learning system includes a CNN (as described above), the digital image editing system 108 can define a first fully connected layer of the CNN as the feature vector ($x_m$).

In addition to generating the feature vector ($x_m$) of the digital image 202, the digital image editing system 108 receives noise data 206. The noise data 206 can represent unexplained variations and/or randomness in sample images and/or the digital image 202. As will be described in further detail below, the noise data 206 enables the process of determining a plurality of predicted image edits for a digital image 202 to be a more stochastic process instead of a more deterministic process. In some embodiments, the noise data 206 can include a normal distribution of data having a fixed mean and fixed values. Furthermore, in one or more embodiments, the noise data 206 is already stored on the digital image editing system 108. In other words, the noise data 206 may already be present on the digital image editing system 108, and accordingly, receiving a noise data 206 may not occur in every embodiment.

Regardless, based on the noise data 206, the digital image editing system 108 determines one or more latent variables ($s_m$) (e.g., noise elements), as shown in act 228 of FIG. 2A. For example, in one or more embodiments, the digital image editing system 108 can infer (e.g., assume) the latent variables ($s_m$) from the noise data 206 utilizing an expectation-maximization (EM) algorithm, which includes an iterative method for finding maximum a posterior estimates of parameters. The parameter estimates are then utilized to determine a distribution of the latent variables ($s_m$). The term "latent variables" can refer to variables that are not directly measurable and/or observed. Thus, "latent variables" can comprise variables that are inferred through modeling (e.g., machine learning modeling) by using features of a digital image that are observed. Similarly, the terms "latent variables" can refer to variables that are generated by modeling indirect data through feature learning.

In additional embodiments, the digital image editing system 108 can infer the latent variables ($s_m$) from the noise data 206 utilizing a variational recognition model with the variational lower bound being parameterized by standard stochastic gradient methods. For example, the digital image editing system 108 can infer the latent variables ($s_m$) from the noise data utilizing one or more of the methods of inferring latent variables ($s_m$) described in P. Kingma et al., *Auto-encoding variational bayes*, arXiv preprint arXiv:1312.6114 (2013), the disclosure of which is incorporated by reference herein in its entirety. In further embodiments, the digital image editing system 108 can infer the latent variables ($s_m$) utilizing a pre-trained neural network that includes a conditional variational autoencoder, which is described in further detail below.

Upon determining the feature vector ($x_m$) of the digital image 202 and the latent variables ($s_m$), the digital image editing system 108 concatenates (i.e., links) the feature vector ($x_m$) and the latent variables ($s_m$) and inputs the feature vector ($x_m$) and the latent variables ($s_m$) into a pre-trained neural network 208 (labeled as "NNγ"), as shown in act 230 of FIG. 2A. As noted above, in some embodiments, the pre-trained neural network 208 includes a conditional variational autoencoder 208 (referred to hereinafter as "CVAE"). The CVAE can include the variational autoencoder described in P. Kingma et al., *Auto-encoding variational bayes*, arXiv preprint arXiv:1312.6114 (2013) conditioned on the input digital images (i.e., the feature vector ($x_m$)) concatenated with the latent variables ($s_m$). Furthermore, in some embodiments, the CVAE can include a plurality of (e.g., two, four, eight, etc.) hidden layers. Additionally, one or more of the hidden layers of the CVAE can be for observation and one or more of the hidden layers of the CVAE can be for recognition. Moreover, each of the hidden layers can include a same number of hidden nodes (e.g., 100 or 1000). The CVAE and its structure are discussed in greater detail below in regard to the algorithms and equations described in further below.

To facilitate explanation of the CVAE and its function, a brief explanation of the training of the CVAE is provided below. In particular, the CVAE is pre-trained with image data (e.g., training data) to determine predicted image edits of input digital images (e.g., digital image 202), as shown in act 232 of FIG. 2A. Specifically, by analyzing the image data (e.g., 500,000+ digital images) via machine learning processes, the CVAE learns predicted image edits of given digital images based on the individual features of the given digital images and how a user would typically edit the given digital images based on their features. For example, the CVAE learns a set of styles to predict (e.g., a set or predicted image edits) for a given digital image (e.g., digital image 202) based on its features and how users have edited images having the same or similar features. Specifically, the CVAE learns a 2D latent space (i.e., an X and Y coordinate) where each point in the 2D latent space maps to a predicted image edit of the given digital image and has some associated probability. Additionally, the 2D latent space includes a continuous variation of predicted image edits (e.g., predicted styles of edits). As a result of the foregoing, the CVAE learns from the training data multiple examples (i.e., predicted image edits) of how a user would likely edit an input digital image given the input digital image's respective features.

In some embodiments, the image data can include edited digital images that have been edited by users and corresponding non-edited digital images. Additionally, for the edited digital images, the image data can include data indicating how the digital images of the image data were edited (e.g., what image attribute values where manipulated and to what degree the image attribute values were manipulated). Furthermore, for the non-edited digital images, the image data can include data indicating of the image attribute values of the non-edited digital images. Furthermore, the image data can include edited digital images that have only a single image edit because the digital image editing system 108 does not require redundant image edits per training image.

As used herein, the term "image attribute values," when referring to a digital image, refers to values (e.g., measurements, amounts, etc.) of attributes of a digital image. For example, "image attribute values" can refer to values for the contrast, exposure, saturation, temperature, tint, highlights, shadows, whites, blacks, lights, darks, clarity, and vibrance of a digital image. Furthermore, "image attribute values" can refer to values for colors (e.g., red, orange, yellow, green, aqua, blue, purple, magenta, etc.) of a digital image. Moreover, "image attribute values" can refer to values for distortion, defringe, and vignetting of a digital image. Although specific examples of attributes of the digital image are described herein, the image attribute values can refer to values of other attributes of the digital image. Sliders are one way of indicating and modifying image attribute values. As such, in one or more embodiments herein, "slider values" are an example of image attribute values. In alternative embodiments, the digital image editing system 108 can utilize another user interface element to display or receive modifications to the image attribute values described above, including text elements (e.g., numeric values, percentages, etc.), dials, spectrums, radio buttons, drop down menus, etc.

In some embodiments, the CVAE further determines weight values (γ) of elements of input data (e.g., the features of the feature vectors ($x_m$) of input digital images and the latent variables ($s_m$)) inputted into the CVAE prior to the CVAE determining and/or while CNN determines the predicted image edits. Specifically, the CVAE learns weight values (γ) of potential elements of input digital images inputted into the CVAE from the training image data, as shown in act 234 of FIG. 2A. The weight values (γ) constrain (e.g., affect) how elements of the input data (e.g., the features of the feature vectors ($x_m$) of input digital images) are related to output data (e.g., predicted image edits). For example, the CVAE learns what elements of the input data affect output data and by how much each element affects output data. For instance, the CVAE learns (e.g., determines) weight values (γ) of the elements of the input data and associates the weight values (γ) with the respective elements of the input data. In some embodiments, the CVAE can assign more weight to elements that relate to image edits that a user is likely to make. In particular, as will be appreciated by one of ordinary skill in the art, the CVAE is parameterized by the weight values (γ) with the respective elements of the input data.

In order to avoid overfitting, the CVAE utilizes dropout in the last layer of its observation model (e.g., the hidden layers for observation). In particular, the CVAE can set probability of keeping nodes and associated connections between 0.6 and 0.9. Additionally, the CVAE sets a dimension for the latent variables ($s_m$). In some instances, the CVAE can set a value for the dimension for the latent variables ($s_m$) between 2.0 and 5.0. For example, the CVAE can set the values for the dimension for the latent variables ($s_m$) as 2.0 to enable for plotting of the effect of changing their values.

In response to receiving the feature vector ($x_m$) and the latent variables ($s_m$), the CVAE of the digital image editing system 108 determines a distribution of a plurality of sets of potential image attribute values 210 based on the weight values (γ) of the features of the feature vector ($x_m$) and the latent variables ($s_m$), as shown in act 236 of FIG. 2B. In particular, the digital image editing system 108, via the CVAE and with the input of the feature vector ($x_m$) and the latent variables ($s_m$), determines (e.g., generates) a mean of a distribution ($\mu(x_m, s_m; \gamma)$) of a plurality of sets of potential image attribute values 210. Each set of potential image attribute values 210 represents a potential edit of the digital image 202. Furthermore, the mean of the distribution ($\mu(x_m, s_m; \gamma)$) of a plurality of sets of potential image attribute values 210 is mapped within the learned 2D latent space where each point within the 2D latent space represents a set of potential image attribute values 210. In one or more embodiments, the digital image editing system 108, via the neural network 208, generates the mean of the distribution ($\mu(x_m, s_m; \gamma)$) of the plurality of sets of potential image attribute values 210 such that mean of the distribution ($\sim(x_m, s_m; \gamma)$) is conditioned on the feature vector ($x_m$) of the digital image 202 and is a flexible parametric function, such as, for example, a multi-layer perceptron (MLP), of the feature vector ($x_m$) concatenated with the latent variables ($s_m$). Furthermore, because the mean of the distribution ($\mu(x_m, s_m; \gamma)$) is a flexible parametric function (e.g. an MLP), the digital image editing system 108 can determine and generate multiple sets of potential image attribute values (e.g., multimodal densities) for a given input digital image.

In addition to determining mean of a distribution ($\mu(x_m, s_m; \gamma)$) of a plurality of sets of potential image attribute values 210, the digital image editing system 108 selects a plurality of sets of predicted image attribute values ($y_n$) from the mean of the distribution ($\mu(x_m, s_m; \gamma)$) of the plurality of sets of potential image attribute values 210, as shown in act 240 of FIG. 2B. Each set of predicted image attribute values ($y_n$) represents a predicted image edit to the digital image 202. For example, each predicted image edit is represented as a vector of predicted image attribute values ($y_m$) (referred to hereinafter as a "set of predicted image attribute values ($y_m$)"). In some embodiments, selecting a plurality of sets of predicted image attribute values ($y_m$) can include sampling (e.g., regularly sampling) a number (e.g., 1000) of the sets of potential image attribute values 210 from the plurality of sets of potential image attribute values 210 and then selecting the plurality of sets of predicted image attribute values ($y_m$) (e.g., a subset of predicted image attribute values) from the sampled sets of potential image attribute values 210.

As used herein the term a "predicted image edit" and any derivative terms refer to a set of predicted image attribute values that is different than a set of original image attribute values of the digital image (e.g., the image attribute values of the digital image as input into the image editing system). For example, when the set of predicted image attribute values is applied to the digital image, the appearance of the digital image is altered.

In some embodiments, upon sampling a number of the sets of potential image attribute values 210 from the plurality of sets of potential image attribute values 210, the digital image editing system 108 can determine (e.g., identify) a plurality of groups of the sets of potential image attribute values 210 within the plurality of sets of potential image attribute values 210 and can select a set of potential image attribute values 210 from each group of the plurality of groups of the sets of the potential image attribute values. For instance, in some embodiments, the digital image editing system 108 can utilize clustering to determine a plurality of clusters within the sampled sets of potential image attribute values 210. The digital image editing system 108 can then select values from each cluster of the plurality of clusters to be a set of predicted image attribute values. Utilizing k-means clustering to select a plurality of sets of predicted image attribute values ($y_n$) from the mean of the distribution ($\mu(x_m, s_m; \gamma)$) of the plurality of sets of potential image attribute values 210 is described in further detail below in regard to FIG. 3. In other embodiments, clustering methods other than k-means can be employed.

As noted above, each set of predicted image attribute values ($y_n$) represents a predicted image edit to the digital image 202 (i.e., the original image). Accordingly, by selecting a plurality of sets of predicted image attribute values ($y_n$), the digital image editing system 108 determines a plurality of predicted image edits for the digital image 202. Furthermore, as shown in FIG. 2B, each set of predicted image attribute values 212 ($y_m$) includes a plurality of individual predicted image attribute values. For example, each set of predicted image attribute values 212 ($y_m$) can include at least five, seven, nine, eleven, or fifteen individual image attribute values.

Referring again to FIG. 2B, in response to determining the plurality of predicted image edits for the digital image 202, the digital image editing system 108 applies the plurality of predicted image edits to the digital image 202, as shown in act 242 of FIG. 2B. For example, the digital image editing system 108 generates a plurality of edited digital images 214 with each edited digital image of the plurality of edited digital images 214 implementing a respective predicted image edit of the plurality of predicted image edits. Put another way, the image editing system 108 generates a set of different edited versions of the digital image 202, each edited version of the digital image 202 include a predicted image edit applied to the digital image 202. In one or more embodiments, the digital image editing system 108 generates copies of the digital image 202 and manipulates the image attribute values of each copy of the digital image 202 to match the predicted image attribute values of a respective predicted image edit of the plurality of predicted image edits.

Additionally, the digital image editing system 108 provides the plurality of edited digital images 214 to the client device 102 for display to a user, as shown in step 244 of FIG. 2B. For example, the digital image editing system 108 can provide the plurality of edited digital images 214 to the client device 102 via the network 106. In alternative embodiments, such as embodiments not including the network 106 and server 104, the digital image editing system 108 can provide the plurality of edited digital images 214 via the client application 112 of the client device 102. In particular, the digital image editing system 108 can provide preview digital images of the plurality of edited digital images 214 to the client device 102 such that a user can interact with the client device 102 and, via user interaction, select one or more of the plurality of edited digital images 214.

As mentioned above, the digital image editing system 108 can use clustering to select sets of predicted image attribute values. FIG. 3 illustrates an embodiment of using k-means clustering to select a plurality of sets of predicted image attribute values ($y_n$). Furthermore, in one or more embodiments, the acts illustrated in relation to FIG. 3 may be performed within the step 220 for determining a plurality of predicted image edits for the digital image 202. As shown in FIG. 3, in some embodiments, the digital image editing system 108 can utilize k-means clustering to select a plurality of sets of predicted image attribute values ($y_n$), as shown in act 302 of FIG. 3. The term "k-means clustering," as used herein, refers to a method of vector quantization that is used in data mining. In k-means clustering, K observations (e.g., sampled sets of potential image attribute values 210) are partitioned into k clusters in which each observation belongs to the cluster with the nearest mean, serving as a prototype of the cluster. Additionally, k-means clustering is an iterative process that repeats until the clusters are balanced. In k-means clustering, k is a randomly chosen number (e.g., 5, 10, 50 100, 200, 500, 100, 2000, 5000, etc.), and each cluster is assigned a corresponding cluster index number. For example, for 100 observations (i.e., K), and a k can be equal to five, the digital image editing system 108 partitions the 100 observations into five clusters in which each observation belongs to the cluster with the nearest mean.

Upon clustering the sampled sets of potential image attribute values 210 into a plurality of clusters, the digital image editing system 108 selects a set of predicted image attribute values from each cluster of the plurality of clusters, as shown in act 304 of FIG. 3. For example, the digital image editing system 108 can select a centroid (e.g., a center) of each cluster as a set of predicted image attribute values. In additional embodiments, the digital image editing system 108 can select a set of predicted image attribute values from each cluster randomly. Furthermore, the digital image editing system 108 can choose a set of predicted image attribute values from each cluster that has the highest likelihood of occurring (e.g., highest probability). As a non-limiting example, the digital image editing system 108 can cluster the sampled sets of potential image attribute values 210 into five clusters and the digital image editing system 108 can select the centroid of each cluster with each centroid representing a set of predicted image attribute values.

Figure 4:
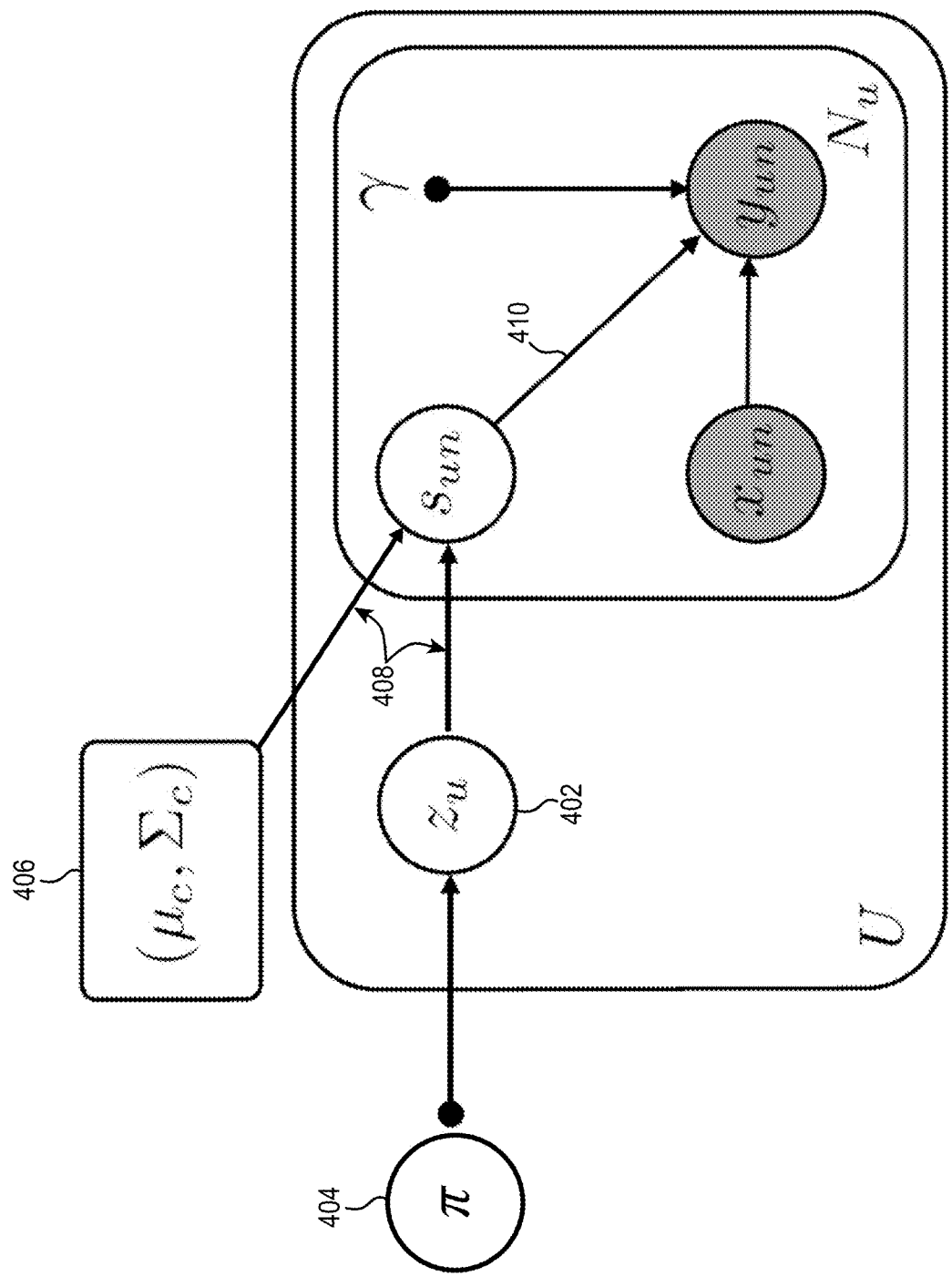
FIG. 4 illustrates a schematic representation of determining a plurality of personalized predicted image edits for a given user in accordance with one or more embodiments.

FIG. 4 shows a schematic representation of a flow diagram of the digital image editing system 108 determining a plurality of personalized predicted image edits ($y_{un}$) according to a determined category (e.g., an editing category) of a user. Furthermore, in one or more embodiments, the acts illustrated in relation to FIG. 4 may be performed within the step 220 for determining a plurality of predicted image edits for the digital image 202.

In particular, the digital image editing system 108 can categorize a given user (e.g., a user providing an input digital image) accordingly to the user's tendencies in editing digital images (e.g., the style and types of edits the user typically applies to digital images), as shown in act 402 of FIG. 4. In one or more embodiments, the digital image editing system 108 determines whether the given user falls within a novice category, a semi-expert category, and/or an expert category. In alternative embodiments, the category does not reflect an editing level but, rather, reflects that the user's tendencies in editing digital images aligns with (e.g., correlates to) tendencies of users shown (i.e., extracted) in the training data. Furthermore, each category can have one or more predicted image edits associated with the category. Moreover, although specific categories are described herein, one of ordinary skill in the art will readily appreciate that the digital image editing system 108 could determine any number of categories of users, and each category could have particular image edits associated with the category.

In some embodiments, the digital image editing system 108 can determine a user's category based at least partially on a history set of image data. The history set of image data can include a record of previous image edits applied to digital images by the user. For example, the history set of image data can indicate that a user prefers to select image edits that result in a digital image being one or more of very colorful, very dark, very extreme, muted, etc. In one or more embodiments, the digital image editing system 108 can include an image edit database, which includes a record (e.g., data) that indicates each digital image that the user has edited within the digital image editing system 108 and how the user edited the digital image. Additionally, when determining the user's category, the digital image editing system 108 can query the edit database to determine how a user has previously edited other digital images given the particular features of the digital image (e.g., digital image 202).

Furthermore, based on previous edits applied by the user (e.g., recorded tendencies of the user in editing digital images), the digital image editing system 108, via the CVAE, can infer a cluster index ($z_u$) (e.g., an interpretable cluster) of the given user. In particular, the digital image editing system 108, via the CVAE, can infer what points (i.e., where) within the 2D latent space (e.g., what areas of the 2D latent space) correlate to the previous edits that the given user typically makes. Furthermore, based on where the given user's previous edits fall within the 2D latent space (e.g., the cluster index ($z_u$)), the digital image editing system 108 can infer a category of the user.

In additional embodiments, the digital image editing system 108 can determine a user's category based at least partially on outside data available to the digital image editing system 108. For example, the outside data can include a demographic of the user (e.g., an age, gender, geography, etc.); whether or not the digital images were taken with a DSLR camera, a cell phone camera, etc.; whether or not the customer is paying for the digital image editing system 108 service, etc.

In addition to determining the user's category, the digital image editing system 108, via the CVAE, generates a latent mixture model (e.g., a latent Dirichlet Process Gaussian mixture model) (referred to herein as a mixture component) and generates mixture weights ($\pi$), component means ($\mu_c$), and covariances ($\Sigma_c$), as shown in acts 404 and 406 of FIG. 4. Generating the latent mixture model is described in further detail below in regard to the algorithms provided below.

Furthermore, as shown in FIG. 4, based on the mixture component, the digital image editing system 108 determines user-specific latent variables ($s_{un}$) that are specific the cluster index ($z_u$), as shown in act 408 of FIG. 4. Furthermore, the 2D latent space, and as a result, the user-specific latent variables ($s_{un}$), are conditioned on the cluster index ($z_u$). Additionally, the digital image editing system 108 utilizes the above-described mixture model to generate the user-specific latent variables ($s_{un}$).

Upon sampling the cluster index ($z_u$) and determining the user-specific latent variables ($s_{un}$), the digital image editing system 108 utilizes, via the CVAE, the cluster index ($z_u$) and user-specific latent variables ($s_{un}$) to determine a plurality of sets (e.g., a vector) of predicted image attribute values for the given digital image 202 that are specific to the category of the user, as shown in act 410 of FIG. 4. In other words, the digital image editing system 108 determines a plurality of predicted image edits ($y_u$) for the given digital image 202 that are specific to the category of the user (e.g., category-specific image edits). Furthermore, in some embodiments, the digital image editing system 108 determines a plurality of sets (e.g., a vector) of predicted image attribute values for the given digital image 202 that are specific to the user. Put another way, the digital image editing system 108 determines a plurality of predicted image edits ($y_{un}$) for the given digital image 202 that are specific (e.g., personalized) to the user (user-specific image edits). The digital image editing system 108 can utilize any of the methods described above in regard to FIGS. 2A-2B in order to determine the plurality of predicted image edits for the given digital image 202.

In addition to the foregoing description, operation of the digital image editing system 108 can also be described in relation to algorithms, equations, or pseudocode performed by a computing device (e.g., a server). More particular, the acts described in regard to FIGS. 2A-4 can involve the following algorithms and equations.

Multimodal Prediction with Conditional Variational Autoencoder (CVAE)

As discussed above, given a digital image for which image edits are desired, the digital image editing system 108 represents the digital image as a feature vector ($x_m$) and the corresponding predicted image edits ($y_m$) as a vector of slider values (e.g., vector values for contrast, exposure, saturation, etc.). Furthermore, for each digital image ($x_m$), the digital image editing system 108 infers a set of latent variables ($s_m$) (i.e., latent features), which also affect (e.g., influence) the predicted image edits ($y_m$). In some embodiments, the digital image editing system 108 generates the vector of slider values $\{y_m\}_{m=1}^N$ of the predicted image edits ($y_m$) conditioned on input digital images $\{x_m\}_{m=1}^N$ according to the following:

$$s_m \overset{iid}{\sim} \mathcal{N}(0, I)$$

$$y_m \mid x_m, s_m, \gamma \overset{iid}{\sim} \mathcal{N}(\mu(s_m, x_m; \gamma), \Sigma(s_m, x_m; \gamma))$$

where $\mu(s_m, x_m; \gamma)$ and $\Sigma(s_m, x_m; \gamma)$ are flexible parametric functions, such as multi-layer perceptrons (MLPs), of the input feature vector ($x_m$) (e.g., input image features) concatenated with the latent variables ($s_m$) (i.e., latent features). Furthermore, the flexible likelihood function in the above equations can determine complex, multimodal densities for the predicted image edits ($y_n$).

In order to determine the latent variables ($s_m$), the digital image editing system 108 approximates the posterior $p_\gamma(s|x, y)$ with a variational recognition model $q_\phi(s|x,y)$ parameterized by $\phi$, expressing $\mathcal{N}(\mu(x_m, y_m; \phi), \Sigma(x_m, y_m; \phi))$. Furthermore, the digital image editing system 108 utilizes an MLP for the mean and covariance and concatenates the feature vector ($x_m$) and latent variables ($s_m$) for the recognition network input.

Given the above generative model and the variational family, to perform inferences, the digital image editing system 108 maximizes a variational lower bound on log $p_\gamma(y|x)$, expressing the objective as:

$$\mathcal{L}(\gamma, \phi) \triangleq \mathbb{E}_{q_\phi(s|x,y)}[p_\gamma(y|s,x)] - KL(q_\phi(s|x,y) \| p(s))$$

The digital image editing system 108 can optimize the above CVAE objective using stochastic gradient methods. For example, the digital image editing system 108 can optimize the above CVAE objective using the stochastic gradient methods described in P. Kingma et al., *Auto-encoding variational bayes*, arXiv preprint arXiv:1312.6114 (2013). Furthermore, the digital image editing system 108 can optimize the above CVAE objective utilizing a reparameterization technique for sampling from $q_\phi(s|y)$ by first sampling from an auxiliary noise variable and then applying a differentiable map to the sampled noise. The foregoing yields a differentiable Monte Carlo estimate of the expectation with respect to $\phi$. As a non-limiting example, the digital image editing system 108 can optimize the above CVAE objective utilizing the reparameterization technique described in P. Kingma et al., *Auto-encoding variational bayes*, arXiv preprint arXiv:1312.6114 (2013).

Categorization and Personalization

In some embodiments, the digital image editing system 108 can categorize users based on the users' adjustment styles (e.g., the tendencies of the user in editing digital images) by extending the CVAE described above to include clusters in the 2D latent space. In particular, the number of user categories is unbounded as priori, and as a result, the CVAE of the digital image editing system 108 utilizes a Bayesian nonparametric prior to infer (e.g., determine) the number of categories of users in the data (e.g., the training data described above in regard to FIG. 2).

Initially, the CVAE of the digital image editing system 108 models the user categories by generating a latent Dirichlet Process (DP) Gaussian mixture model. Specifically, the CVAE generate the mixture weights r and component means and covariances $\mu_k$ and $\Sigma_k$ for k=1, 2, ... as follows:

$$\pi - GEM(\alpha)$$

$$\pi \sim GEM(\alpha)$$

$$(\mu_k, \Sigma_k) \overset{iid}{\sim} NIW(\lambda)$$

where GEM ($\alpha$) represents a stick-breaking process with concentration parameter $\alpha[\ ]$. The CVAE of the digital image editing system 108 determines the mixtures weights and component parameters according to the following:

$$\Lambda = (\pi, \{(\mu_k, \Sigma_k)\}_{k=1}^\infty)$$

Additionally, the CVAE of the digital image editing system 108 utilizes the above mixture model to generate user-specific latent attributes. In such mixture model, the CVAE of the digital image editing system 108 defines M users in total and a user m having $N_m$ digital images. For each user m, the CVAE samples a cluster index $z_m$ to determine (e.g., identify) each user's category. Furthermore, for each digital image n, the CVAE samples a latent attribute vector $s_{nm}$ from the corresponding component according to the following:

$$z_m | \pi \overset{iid}{\sim} \pi, s_{nm} | z_m, \{\mu_k, \Sigma_k\}_{k=1}^\infty \overset{iid}{\sim} \mathcal{N}(\mu_{z_m}, \Sigma_{z_m})$$

Furthermore, the CVAE utilizes the latent attribute vector $s_{nm}$ to generate the vector of suggested (e.g., edited) slider values $y_{nm}$. Moreover, the CVAE utilizes a multivariate normal distribution with a mean and variance generated from the following MLP parameterized by $\gamma$:

$$y_{nm} \mid x_{nm}, s_{nm}, \gamma \overset{iid}{\sim} \mathcal{N}(\mu(s_{nm}, x_{nm}; \gamma), \Sigma(s_{nm}, x_{nm}; \gamma))$$

In addition, for inference in a Dirichlet Process Mixture (DPM) structured variational autoencoder (SVAE), the goal is to maximize the following variational lower bound:

$$\mathcal{L} \overset{\Delta}{=} \mathbb{E}_q \left[ \log \frac{p(x, y, s, z, \pi, \Lambda)}{q(s)q(z)q(\pi)q(\Lambda)} \right]$$

To optimize the above objective, the CVAE utilizes the inference framework described J. Johnson et al., *Structured vaes: Composing probabilistic graphical models and variational autoencoders*, arXiv preprint arXiv:1603.06277 (2016), the disclosure of which is incorporated by reference herein in its entirety.

Variational Factors

In order to develop an efficient variational inference, the digital image editing system 108 utilizes a degree L weak limit approximation to the Dirichlet Process. Furthermore, in an infinite limit, the L-dimensional Dirichlet distribution Dir($\alpha/L, \ldots, \alpha/L$) converges in distribution to a true Dirichlet Process. Additionally, L is the upper bound of the expected number of categories, and the approximation encourages the model to learn fewer than L categories but the approximation allows the model to generate new categories (upper bound by L) with newly observed data.

Given the weak limit approximation to DP and since $\pi$ is a global variable in the graphical model, the CVAE of the digital image editing system 108 restricts $q(\pi)$ to be in the form of a Dirichlet distribution (Dir) with a natural parameter $\eta\pi$. In some embodiments, the digital image editing system 108 utilizes L={10, 20} for the weak limit approximation of the DP and {0.001, 0.0001} for the step-size of natural parameter updates. For the other global variable, $\Lambda$, the CVAE of the digital image editing system 108 sets the optimal variational factor $q(\Lambda)$ to be a normal-inverse Wishart (NIW) with natural parameter $\eta_\Lambda$.

For the local variables s and z, the CVAE of the digital image editing system 108 restricts $q(s)$ to be in the form of $\mathcal{N}$ with natural parameter $\eta_s$, and the CVAE defines $q(z)$ in the multinomial form with natural parameter $\eta_z$. Additionally, the CVAE, via the the recognition model $r((x,y);\phi)$ used in the above-surrogate objective, outputs the natural parameters of a NIW because $\langle r((x,y);\phi), t_s(s) \rangle$ has a conjugate form to $p(s|z)$.

Variational Updates

For the stochastic variational inference in a SVAE, the CVAE of the digital image editing system 108 updates the local factors of a sampled user from the dataset and then updates the global factors using the expectations with respect to the local factors. The stochastic gradient update after sampling a user u from the dataset of N users, for the local variables $z_u$ and $s_{mu}$ can be obtained from:

$$\tilde{\pi}_u \propto \exp\left\{ \mathbb{E}_{q(\pi)}[\log\pi] + \sum_{n=1}^{N_u} \mathbb{E}_{q^*(s_{mu})}[\log s_{mu}] \right\}$$

$$\eta^*_{s_{mu}}(\eta_\pi, \eta_\Lambda, \eta_z, \phi) \overset{\Delta}{=} \operatorname{argmin}_{\eta_{s_{mu}}} \hat{\mathcal{L}}(\eta_\pi, \eta_\Lambda, \eta_z, \eta_{s_{mu}}, \phi)$$

Additionally, after the local update, the CVAE of the digital image editing system 108 utilizes the expected sufficient statistics $\mathbb{E}_{q(z_u)} t_{z_u}$ and $\mathbb{E}_{q^*(s_{mu})} t_{s_{mu}}$ for perform global updates. According, for the global variables $\pi$ and $\Lambda$, the CVAE of the digital image editing system 108 performs the global updates according to the following:

$$\nabla_{\eta_\pi} \leftarrow \eta_\pi^0 - \eta_\pi + N \mathbb{E}_{q(z_u)}[(z, 1)]$$

$$\nabla_{\eta_\Lambda} \leftarrow \eta_\Lambda^0 - \eta_\Lambda + N\tilde{\pi}_u \sum_{n=1}^{N_u} \mathbb{E}_{q^*(s_{mu})}[(t_{s_{mu}}, 1)] +$$

$$N \sum_{n=1}^{N_u} \left( \nabla_{\eta_{s_{mu}}} \log p_\gamma(y_{mu} \mid \hat{s}_{mu}, x_{mu}), 0 \right)$$

where $\hat{s}_{mu}$ is a sample from $q^*(s_{mu})$.

Moreover, the CVAE of the digital image editing system 108 determines the gradients with respect to $\gamma$ and $\phi$ (i.e., the parameters of the observation model and the recognition model). For example, utilizing the SVAE framework described above, the CVAE of the digital image editing system 108 determines the gradients of the following objective function:

$$\mathcal{L}_{CSV\,AE} \overset{\Delta}{=}$$

$$N \sum_{n=1}^{N_u} \log p_\gamma(y_{mu} \mid x_{mu}, \hat{s}_{mu}) - N \mathbb{E}_{q(z_u)q(\Lambda)} \sum_{n=1}^{N_u} KL(q^*(s_{mu}) \| p(s_{mu} \mid z_u, \Lambda)) -$$

$$N \mathbb{E}_{q(s_u)q(\pi)} KL(q(z_u) \| p(z_u \mid s_{u}, \pi)) - KL(q(\pi)q(\Lambda) \| p(\pi)p(\Lambda))$$

In the above algorithms, the $q^*(s)$ function of $\phi$ and $\nabla_\phi \mathcal{L}_{CSV\,AE}$ can be estimated via automatic differentiation. For example, the back-ward pass in the automatic differentiation for estimating $\nabla_\phi \mathcal{L}_{CSV\,AE}$ can automatically compute the second term in the following:

$$N \sum_{n=1}^{N_u} \left( \nabla_{\eta_{s_{mu}}} \log p_\gamma(y_{mu} \mid \hat{s}_{mu}, x_{mu}), 0 \right)$$

Furthermore, the KL divergence terms in the objective function, $-KL(q(\pi)q(\Lambda) \| p(\pi)p(\Lambda))$, can be computed without estimation as the divergences terms are between the members of the same exponential family.

Adjusting for Sparse Edits in the Datasets

In some instances, the training data (e.g., image data discussed above in regard to FIGS. 2A and 2B) can include slider values that are mostly set to a default value, which is zero (i.e., no edit was made to the digital image). Accordingly, the digital image editing system 108 accounts for this (i.e., the frequent default (zero) observations) with a zero-inflated observation model. For example, the digital image editing system 108 model the ith image attribute value with a zero-inflated Gaussian distribution according to the following:

$$p_\gamma^{ZI}(y_m^i = 0 \mid x_m, s_m) = \pi^i + (1 - \pi^i) p_\gamma(y_m^i = 0 \mid x_m, s_m)$$

$$p_\gamma^{ZI}(y_n^i = z \mid x_m, s_m) = (1 - \pi^i) p_\gamma(y_m^i = z \mid x_m, s_m) \quad s \neq 0$$

where $\pi^i$ is the probability of setting the ith image attribute value to zero. Furthermore, the digital image editing system 108 estimates this parameter as part of $\gamma$ (i.e., the parameters of the observation model).

FIGS. 1-4, the corresponding text, and the examples, provide a number of different systems and devices for predicting multimodal image edits. In addition to the foregoing, embodiments also can be described in terms of flowcharts comprising acts and steps in a method for accomplishing a particular result. For example, FIG. 5 illustrates a flowchart of exemplary methods in accordance with one or more embodiments.

Figure 5:
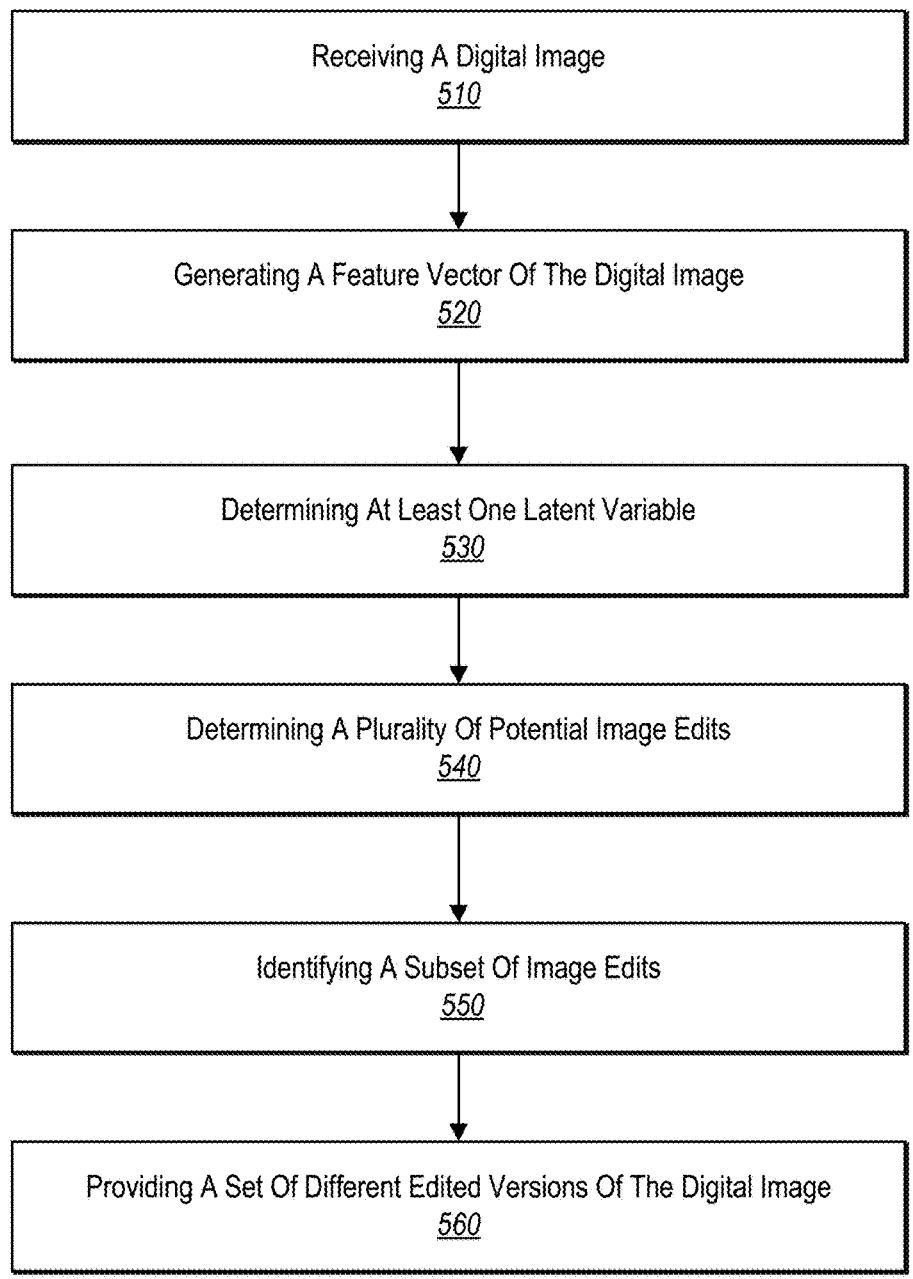
FIG. 5 shows a flowchart of an example method for determining a plurality of predicted images edits for a digital image in accordance with one or more embodiments of the present disclosure.

FIG. 5 illustrates a flowchart of an example method for predicting multimodal image edits. The method can be implemented by the image editing system 108 described above. The method involves an act 510 of receiving a digital image 202. For example, act 510 can include receiving a digital image 202 from a client device 102. Moreover, the act 510 may include any of the actions described above in regard to act 222 of FIG. 2A.

The method may further include an act 520 of generating a feature vector ($x_m$). Specifically, the act 520 can include generating a feature vector ($x_m$) of the digital image 202, wherein each value of the feature vector ($x_m$) represents a respective feature of the digital image 202. Furthermore, the act 520 can include generating a feature vector ($x_m$) of the digital image 222 by feeding the digital image into a convolutional neural network 204. Moreover, the act 520 can include any of the actions described above in regard to act 226 of FIG. 2A.

Additionally, the method includes an act 530 of determining at least one latent variable ($s_m$). In particular, the act 530 may include determining at least one latent variable ($s_m$) comprising a variable that is not directly measurable from noise data. In some embodiments, the act 530 can include determining at least one latent variable ($s_m$) from unexplained variations and/or randomness in sample images and/or the digital image 202. Additionally, the act 530 can include any of the actions described above in regard to act 228 of FIG. 2A.

Moreover, the method includes an act 540 of determining a plurality of potential image edits. For example, the act 540 may include determining a plurality of potential image edits based on the feature vector ($x_m$) of the digital image 202 and the at least one latent variable ($s_m$). Additionally, the act 540 can include determining a plurality of potential image edits comprises generating the plurality of potential image edits via a conditional variational autoencoder 208. Furthermore, the act 540 can include determining a mean distribution 210 of the plurality of potential image edits via a conditional variational autoencoder, k-means clustering the mean distribution 210 to determine a plurality of clusters, and selecting a cluster center from each cluster of the plurality of clusters as a predicted image edit of the plurality of predicted image edits. Moreover, the act 540 can include, based on determined weight values ($\gamma$) of features represented by the feature vector ($x_m$) of the digital image 202, determining the plurality of potential image edits. In some embodiments, each potential image edit comprises at least eleven individual slider values. In additional embodiments, each predicted image edit comprises a set of predicted slider values. Additionally, the act 540 may include any of the actions described above in regard to acts 230, 236, 240, and 242 of FIGS. 2A and 2B.

Furthermore, the method includes an act 550 of identifying a subset of image edits. For instance, the act 550 can include identifying a subset of image edits from the plurality of potential image edits. Furthermore, the act 550 can include determining a plurality of groups of the potential image edits within the plurality of potential image edits and selecting an image edit from each group of the plurality of groups of the potential image edits. Moreover, the act 550 can include k-means clustering the plurality of potential image edits to determine a plurality of clusters and selecting a cluster center from each cluster of the plurality of clusters as an image edit of the subset of image edits. Also, the act 550 include any of the actions described above in regard to acts 230, 236, 240, and 242 of FIGS. 2A and 2B and acts 302 and 304 of FIG. 3.

The method can further include an act 560 of providing a set of edit versions of the digital image. For example, the act 560 can include providing a set of different edited versions of the digital image 202, each edited version of the digital image comprising an image edit of the subset of image edits applied to the digital image 202. Additionally, the act 560 can include any of the actions described above in regard to acts 240, 242, and 244 of FIG. 2B.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
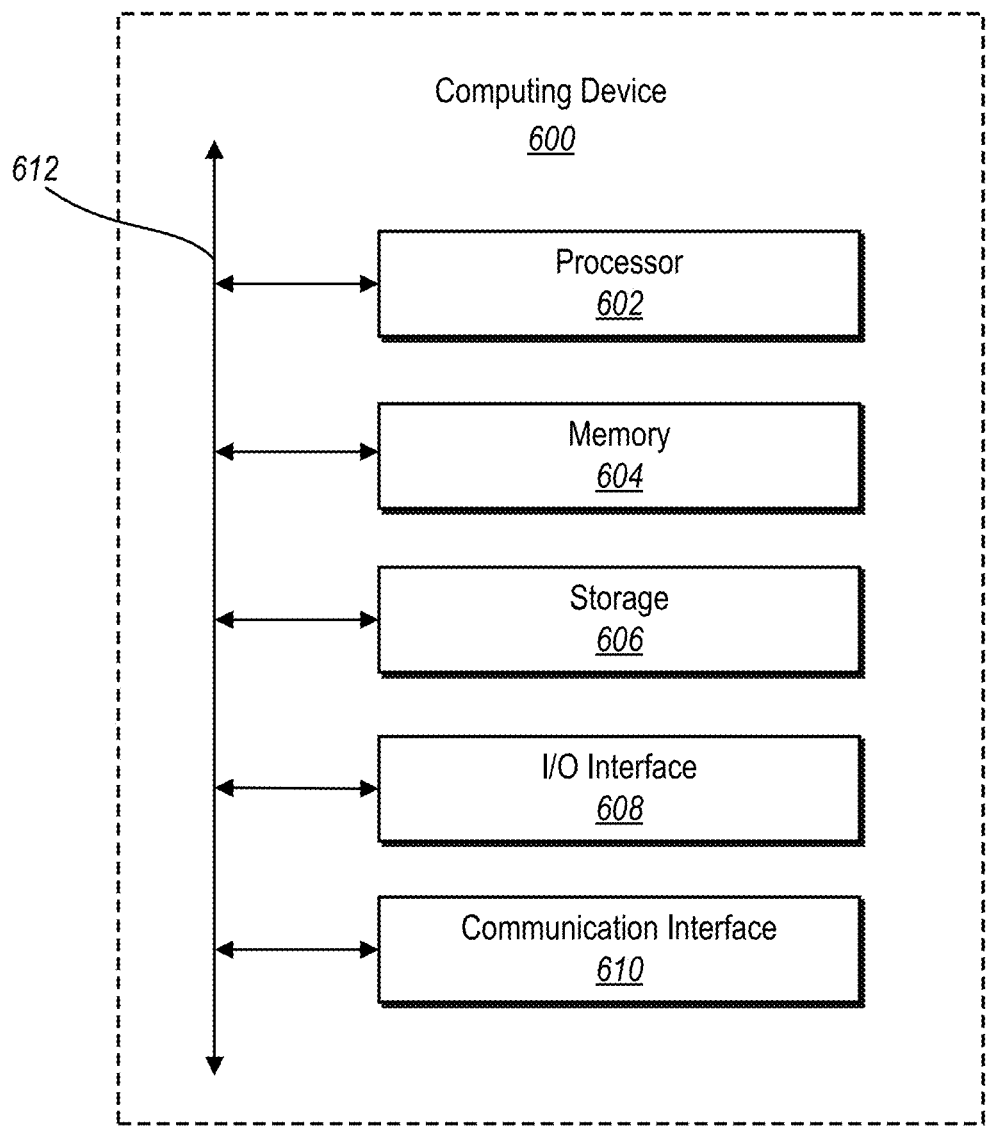
FIG. 6 illustrates a block diagram of an example computing device in accordance with one or more embodiments of the present disclosure.

FIG. 6 illustrates a block diagram of an example computing device 600 that may be configured to perform one or more of the processes described above. One will appreciate that one or more computing devices such as the computing device 600 may implement the media system 108 and/or client device 102. As shown by FIG. 6, the computing device 600 can comprise a processor 602, a memory 604, a storage device 606, an I/O interface 608, and a communication interface 610, which may be communicatively coupled by way of a communication infrastructure 612. While an example computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example, and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation look aside buffers (TLBs). Instructions in the instruction caches may be copies of instructions in the memory 604 or the storage 606.

The computing device 600 includes memory 604, which is coupled to the processor(s) 602. The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The computing device 600 includes a storage device 606 that includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 600 also includes one or more input or output ("I/O") devices/interfaces 608, which are provided to allow a user to provide input to, receive output from, and otherwise transfer data to and receive data from computing device 600. The I/O devices/interfaces 608 may include a mouse, a keypad or a keyboard, a touch screen, a camera, an optical scanner, network 108 interface, modem, other known I/O devices or a combination of such I/O device/interfaces. The touch screen may be activated with a stylus or a finger.

The I/O devices/interfaces 608 may include one or more devices for presenting output to a user, including, but not limited to, a graphics engine, a display (e.g., a display screen), one or more output drivers (e.g., display drivers), one or more audio speakers, and one or more audio drivers.

In certain embodiments, the I/O interface 608 is configured to provide graphical data to a display for presentation to a user. The graphical data may be representative of one or more graphical user interfaces and/or any other graphical content as may serve a particular implementation.

The computing device 600 can further include a communication interface 610. The communication interface 610 can include hardware, software, or both. The communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI. The computing device 600 can further include a bus 612. The bus 612 can comprise hardware, software, or both that couples components of computing device 600 to each other.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this invention. Indeed, various modifications of the present disclosure, in addition to those shown and described herein, such as alternative useful combinations of the content features described, may become apparent to those skilled in the art from the description. Such modifications and embodiments are also intended to fall within the scope of the appended claims and legal equivalents.

We claim:

1. A system for identifying multimodal image edits for a digital image, the system comprising:
    one or more processors; and
    memory coupled to the one or more processors, the memory encoded with a set of instructions that, when executed by the one or more processors, causes the one or more processors to:
    receive a digital image from a client device;
    generate a feature vector representing the digital image, wherein generating the feature vector includes feeding the digital image into a convolutional neural network, wherein each value of the feature vector represents a feature of the digital image;
    determine at least one latent variable from noise data;
    determine a plurality of potential image edits based on the feature vector of the digital image and the at least one latent variable by feeding the feature vector and the at least one latent variable into a conditional variational autoencoder;
    identify a subset of image edits from the plurality of potential image edits by clustering the plurality of potential image edits; and
    provide a set of differently edited versions of the digital image, each edited version of the digital image comprising an image edit of the subset of image edits applied to the digital image.

2. The system of claim 1, wherein identifying a subset of image edits from the plurality of potential image edits further comprises:
    receiving data representing a user's previous edits performed on other digital images;
    clustering, based at least partially on the data representing the user's previous edits, the plurality of potential image edits to determine a plurality of clusters; and
    selecting a cluster center of each cluster of the plurality of clusters, the cluster center representing an image edit of the subset of image edits.

3. The system of claim 2, further comprising instructions that, when executed by the one or more processors, cause the system to associate, based at least partially on the data representing the user's previous edits, an editing category with the user.

4. The system of claim 3, wherein associating the editing category with the user comprises associating an expert editing category with the user.

5. The system of claim 1, further comprising instructions that, when executed by the one or more processors, cause the system to:
    determine a weight value of each feature of the digital image represented in the feature vector; and
    determine, based at least in further part on the weight value of each feature of the digital image represented in the feature vector, the plurality of potential image edits.

6. The system of claim 1, wherein each image edit of the subset of image edits comprises a plurality of individual image attribute values.

7. The system of claim 1, wherein identifying a subset of image edits from the plurality of potential image edits further comprises:
    determining a mean distribution of the plurality of potential image edits via the conditional variational autoencoder;
    k-means clustering the mean distribution to determine a plurality of clusters; and
    selecting a cluster center from each cluster of the plurality of clusters, the cluster center representing an image edit of the subset of image edits.

8. In a digital medium environment for editing digital images, a method of providing a plurality of differently edited digital images, the method comprising:
    receiving a digital image from a client device;
    generating a feature vector representing the digital image, wherein generating the feature vector includes feeding the digital image into a convolutional neural network, wherein each value of the feature vector represents a feature of the digital image;
    determining at least one latent variable from noise data;
    determining a plurality of potential image edits based on the feature vector of the digital image and the at least one latent variable by feeding the feature vector and the at least one latent variable into a conditional variational autoencoder;

identifying a subset of image edits from the plurality of potential image edits by clustering the plurality of potential image edits; and providing a set of differently edited versions of the digital image, each edited version of the digital image comprising an image edit of the subset of image edits applied to the digital image.

9. The method of claim 8, wherein identifying a subset of image edits from the plurality of potential image edits comprises:

receiving data representing a user's previous edits performed on other digital images;

clustering, based at least partially on the data representing the user's previous edits, the plurality of potential image edits to determine a plurality of clusters; and selecting a cluster center of each cluster of the plurality of clusters, the cluster center representing an image edit of the subset of image edits.

10. The method of claim 9, further comprising associating, based at least partially on the data representing the user's previous edits, an editing category with the user.

11. The method of claim 10, wherein associating the editing category with the user comprises associating an expert editing category with the user.

12. The method of claim 8, further comprising:

determining a weight value of each feature of the digital image represented in the feature vector; and determining, based at least in further part on the weight value of each feature of the digital image represented in the feature vector, the plurality of potential image edits.

13. The method of claim 8, wherein each image edit of the subset of image edits comprises at least eleven individual image attribute values.

14. The method of claim 8, wherein identifying a subset of image edits from the plurality of potential image edits further comprises:

determining a mean distribution of the plurality of potential image edits via the conditional variational autoencoder;

k-means clustering the mean distribution to determine a plurality of clusters; and selecting a cluster center from each cluster of the plurality of clusters, the cluster center representing an image edit of the subset of image edits.

15. A non-transitory computer readable medium comprising instructions that, when executed by at least one processor, cause a computer system to:

receive a digital image from a client device;

generate a feature vector representing the digital image, wherein generating the feature vector includes feeding the digital image into a convolutional neural network, wherein each value of the feature vector represents a feature of the digital image;

determine at least one latent variable from noise data;

determine a plurality of potential image edits based on the feature vector of the digital image and the at least one latent variable by feeding the feature vector and the at least one latent variable into a conditional variational autoencoder;

identify a subset of image edits from the plurality of potential image edits by clustering the plurality of potential image edits; and provide a set of differently edited versions of the digital image, each edited version of the digital image comprising an image edit of the subset of image edits applied to the digital image.

16. The non-transitory computer readable medium of claim 15, further comprising instructions that, when executed by the at least one processor, cause the computer system to identify a subset of image edits from the plurality of potential image edits by:

receiving data representing a user's previous edits performed on other digital images;

clustering, based at least partially on the data representing the user's previous edits, the plurality of potential image edits to determine a plurality of clusters; and selecting a cluster center of each cluster of the plurality of clusters, the cluster center representing an image edit of the subset of image edits.

17. The non-transitory computer readable medium of claim 15, further comprising instructions that, when executed by the at least one processor, cause the computer system to associate, based at least partially on the data representing a user's previous edits, an editing category with the user.

18. The non-transitory computer readable medium of claim 15, further comprising instructions that, when executed by the at least one processor, cause the computer system to:

determine a weight value of each feature of the digital image represented in the feature vector; and determine, based at least in further part on the weight value of each feature of the digital image represented in the feature vector, the plurality of potential image edits.

19. The non-transitory computer readable medium of claim 15, wherein each determined potential image edit of the plurality of determined potential image edits comprises a set of determined image attribute values.

20. The non-transitory computer readable medium of claim 15, further comprising instructions that, when executed by the at least one processor, cause the computer system to identify a subset of image edits from the plurality of potential image edits by:

determining a mean distribution of the plurality of potential image edits via the conditional variational autoencoder;

k-means clustering the mean distribution to determine a plurality of clusters; and selecting a cluster center from each cluster of the plurality of clusters, the cluster center representing an image edit of the subset of image edits.

* * * * *